United States Patent
Bushey et al.

(10) Patent No.: US 10,204,226 B2
(45) Date of Patent: Feb. 12, 2019

(54) FEATURE AND BOUNDARY TUNING FOR THREAT DETECTION IN INDUSTRIAL ASSET CONTROL SYSTEM

(71) Applicant: General Electric Company, Schenectady, NY (US)

(72) Inventors: Cody Joe Bushey, Clifton Park, NY (US); Lalit Keshav Mestha, North Colonie, NY (US); Justin Varkey John, Niskayuna, NY (US); Daniel Francis Holzhauer, Santa Clarita, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 92 days.

(21) Appl. No.: 15/371,905

(22) Filed: Dec. 7, 2016

(65) Prior Publication Data
US 2018/0157838 A1 Jun. 7, 2018

(51) Int. Cl.
*G06F 21/57* (2013.01)
*H04L 29/06* (2006.01)
*G06N 99/00* (2010.01)
*G06F 21/55* (2013.01)

(52) U.S. Cl.
CPC ............ *G06F 21/57* (2013.01); *G06F 21/552* (2013.01); *G06N 99/005* (2013.01); *H04L 63/1483* (2013.01)

(58) Field of Classification Search
None
See application file for complete search history.

(56) References Cited

U.S. PATENT DOCUMENTS

| | | | |
|---|---|---|---|
| 7,627,454 B2 | 12/2009 | LaComb et al. | |
| 8,474,043 B2 | 6/2013 | Sturges et al. | |
| 8,706,914 B2 | 4/2014 | Duchesneau | |
| 8,922,226 B2 | 12/2014 | Maher et al. | |
| 9,046,886 B2 | 6/2015 | Chong et al. | |
| 9,158,926 B2 | 10/2015 | Wentz et al. | |
| 9,223,972 B1 | 12/2015 | Vincent et al. | |
| 9,319,425 B2 | 4/2016 | Giokas | |
| 9,405,900 B2 | 8/2016 | Dixit et al. | |
| 9,998,487 B2 * | 6/2018 | Mestha | H04L 63/1425 |
| 2008/0298544 A1 | 12/2008 | Dugan | |

(Continued)

*Primary Examiner* — Christopher A Revak
(74) *Attorney, Agent, or Firm* — GE Global Patent Operation; Nitin Joshi

(57) ABSTRACT

According to some embodiments, a threat detection model creation computer may receive a series of normal monitoring node values (representing normal operation of the industrial asset control system) and generate a set of normal feature vectors. The threat detection model creation computer may also receive a series of threatened monitoring node values (representing a threatened operation of the industrial asset control system) and generate a set of threatened feature vectors. At least one potential decision boundary for a threat detection model may be calculated based on the set of normal feature vectors, the set of threatened feature vectors, and an initial algorithm parameter. A performance of the at least one potential decision boundary may be evaluated based on a performance metric. The initial algorithm parameter may then be tuned based on a result of the evaluation, and the at least one potential decision boundary may be re-calculated.

20 Claims, 17 Drawing Sheets

(56) References Cited

U.S. PATENT DOCUMENTS

| | | | |
|---|---|---|---|
| 2009/0019546 A1* | 1/2009 | Park | G06F 21/57 |
| | | | 726/24 |
| 2009/0049549 A1* | 2/2009 | Park | G06F 21/55 |
| | | | 726/22 |
| 2015/0324589 A1 | 11/2015 | Thanos et al. | |
| 2016/0226894 A1* | 8/2016 | Lee | H04L 63/1416 |
| 2017/0193225 A1* | 7/2017 | Moon | G06F 21/55 |
| 2017/0359366 A1* | 12/2017 | Bushey | H04W 4/38 |
| 2018/0096144 A1* | 4/2018 | Pan | G06F 21/563 |
| 2018/0137277 A1* | 5/2018 | Mestha | G06F 21/554 |
| 2018/0159879 A1* | 6/2018 | Mestha | H04L 63/1425 |

\* cited by examiner

| | | Predicted Condition | |
|---|---|---|---|
| Total Population | | Predicted Condition Positive | Predicted Condition Negative |
| True Condition | Condition Positive | True Positive 1110 | False Negative 1140 |
| | Condition Negative | False Positive 1130 | True Negative 1120 |

| Total Population | Prevalence $= \frac{\Sigma\, Condition\ Positive}{\Sigma\, Total\ Population}$ | | |
|---|---|---|---|
| | True Positive Rate, Sensitivity, Recall $= \frac{\Sigma\, True\ Positive}{\Sigma\, Condition\ Positive}$ | False Negative Rate, Miss Rate $= \frac{\Sigma\, False\ Negative}{\Sigma\, Condition\ Positive}$ | |
| | False Positive Rate, Fall-Out $= \frac{\Sigma\, False\ Positive}{\Sigma\, Condition\ Negative}$ | True Negative Rate, Specificity $= \frac{\Sigma\, True\ Negative}{\Sigma\, Condition\ Negative}$ | |
| Accuracy $= \frac{\Sigma\, True\ Positive + True\ Negative}{\Sigma\, Total\ Population}$ | Positive Predictive Value, Precision $= \frac{\Sigma\, True\ Positive}{\Sigma\, Test\ Outcome\ Positive}$ | False Omission Rate $= \frac{\Sigma\, False\ Negative}{\Sigma\, Test\ Outcome\ Negative}$ | Positive Likelihood Ratio $= \frac{TPR}{FPR}$ |
| | False Discovery Rate $= \frac{\Sigma\, False\ Positive}{\Sigma\, Test\ Outcome\ Positive}$ | Negative Predictive Value $= \frac{\Sigma\, True\ Negative}{\Sigma\, Test\ Outcome\ Negative}$ | Negative Likelihood Ratio $= \frac{FNR}{TNR}$ |
| | | | Diagnostic Odds Ratio $= \frac{LR+}{LR-}$ |

| MONITORING NODE IDENTIFIER 1702 | MONITORING NODE VALUES 1704 | FEATURES 1706 | FEATURE VECTOR 1708 | GLOBAL FEATURE VECTOR 1710 | DECISION 1712 |
|---|---|---|---|---|---|
| MN_2001 | 1.43, 1.09, 1.61, 1.30, 1.83, 1.36, 1.29, 1.83, 1.21 | | | | ATTACK |
| MN_2002 | 1.50, 1.56, 1.24, 1.96, 1.32, 1.32, 0.54, 2.11, 1.06 | | | | |
| MN_2003 | 1.68, 1.43, 1.17, 1.53, 1.34, 0.42, 1.41, 1.75, 2.17 | | | | |
| MN_2004 | 1.75, 1.2-, 1.02, 1.19, 0.93, 1.73, 1.18, 0.81, 1.90 | | | | |

*FIG. 17*

FEATURE AND BOUNDARY TUNING FOR THREAT DETECTION IN INDUSTRIAL ASSET CONTROL SYSTEM

BACKGROUND

Industrial asset control systems that operate physical systems (e.g., associated with power turbines, jet engines, locomotives, autonomous vehicles, etc.) are increasingly connected to the Internet. As a result, these control systems may be vulnerable to threats, such as cyber-attacks (e.g., associated with a computer virus, malicious software, etc.), that could disrupt electric power generation and distribution, damage engines, inflict vehicle malfunctions, etc. Current methods primarily consider threat detection in Information Technology ("IT," such as, computers that store, retrieve, transmit, manipulate data) and Operation Technology ("OT," such as direct monitoring devices and communication bus interfaces). Cyber-threats can still penetrate through these protection layers and reach the physical "domain" as seen in 2010 with the Stuxnet attack. Such attacks can diminish the performance of a control system and may cause a total shut down or even catastrophic damage to a plant. Currently, Fault Detection Isolation and Accommodation ("FDIA") approaches only analyze sensor data, but a threat might occur in connection with other types of threat monitoring nodes. Also note that FDIA is limited only to naturally occurring faults in one sensor at a time. FDIA systems do not address multiple simultaneously occurring faults as in the case of malicious attacks. Moreover, there may be a number of different ways of measuring the performance of a threat detection system (e.g., false alerts when no threats are present, failures to create alerts when threats are in fact present, how rapidly threats can be detected, etc.). As a result, creation of a suitable threat detection system can be difficult—especially when a substantial number of monitoring nodes of different types are evaluated and various performance metrics need to be considered. It would therefore be desirable to facilitate creation of a suitable threat detection system to protect an industrial asset control system from cyber threats in an automatic and accurate manner.

SUMMARY

According to some embodiments, a threat detection model creation computer may receive a series of normal monitoring node values (representing normal operation of the industrial asset control system) and generate a set of normal feature vectors. The threat detection model creation computer may also receive a series of threatened monitoring node values (representing a threatened operation of the industrial asset control system) and generate a set of threatened feature vectors. At least one potential decision boundary for a threat detection model may be calculated based on the set of normal feature vectors, the set of threatened feature vectors, and at least one initial algorithm parameter. A performance of the at least one potential decision boundary may be evaluated based on a performance metric. The at least one initial algorithm parameter may then be tuned based on a result of the evaluation, and the at least one potential decision boundary may be re-calculated.

Some embodiments comprise: means for receiving a series of normal monitoring node values and generating a set of normal feature vectors, wherein the series of normal monitoring node values over time represent normal operation of the industrial asset control system; means for receiving a series of threatened monitoring node values and generating set of threatened feature vectors, wherein the series of threatened monitoring node values over time represent a threatened operation of the industrial asset control system; means for calculating at least one potential decision boundary for a threat detection model based on the set of normal feature vectors, the set of threatened feature vectors, and at least one initial algorithm parameter; means for evaluating a performance of the at least one potential decision boundary based on a performance metric; and means for tuning the at least one initial algorithm parameter based on a result of said evaluation and re-calculating the at least one potential decision boundary.

Some technical advantages of some embodiments disclosed herein are improved systems and methods to facilitate creation of a suitable threat detection system to protect an industrial asset control system from cyber threats in an automatic and accurate manner.

BRIEF DESCRIPTION OF THE DRAWINGS

FIG. 11 illustrates receiver operator curve measures in accordance with some embodiments.

FIG. 17 is a tabular portion of a monitoring node database according to some embodiments.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
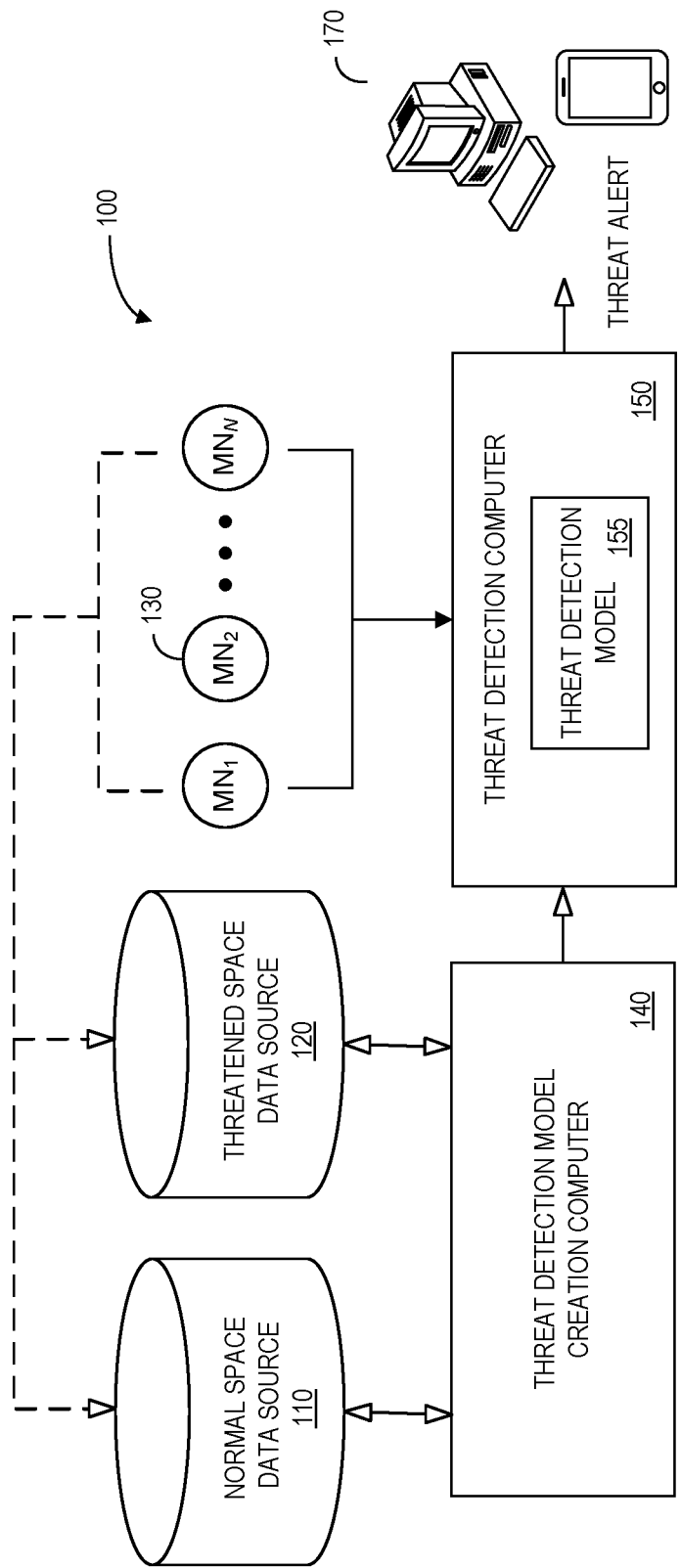
FIG. 1 is a high-level block diagram of a system that may be provided in accordance with some embodiments.

Industrial control systems that operate physical systems are increasingly connected to the Internet. As a result, these control systems may be vulnerable to threats and, in some cases, multiple attacks may occur simultaneously. Existing approaches to protect an industrial control system, such as FDIA approaches, may not adequately address these threats—especially when a substantial number of monitoring nodes of different types are evaluated and various performance metrics need to be considered. It would therefore be desirable to facilitate creation of a suitable threat detection system to protect an industrial asset control system from cyber threats in an automatic and accurate manner. FIG. 1 is a high-level architecture of a system 100 in accordance with some embodiments. The system 100 may include a "normal space" data source 110 and a "threatened space" data source 120. The normal space data source 110 might store, for each of a plurality of "monitoring nodes" 130, a series of normal values over time that represent normal operation of an industrial asset control system (e.g., generated by a model or collected from actual monitoring node 130 data as illustrated by the dashed line in FIG. 1). As used herein, the phrase "monitoring node" might refer to, for example, sensor data, signals sent to actuators, motors, pumps, and auxiliary equipment, intermediary parameters that are not direct sensor signals not the signals sent to auxiliary equipment, and/or control logical(s). These may represent, for example, threat monitoring nodes that receive data from the threat monitoring system in a continuous fashion in the form of continuous signals or streams of data or combinations thereof. Moreover, the nodes may be used to monitor occurrences of cyber-threats or abnormal events. This data path may be designated specifically with encryptions or other protection mechanisms so that the information may be secured and cannot be tampered with via cyber-attacks. The threatened space data source 120 might store, for each of the monitoring nodes 130, a series of threatened values that represent a threatened operation of the industrial asset control system (e.g., when the system is experiencing a cyber-attack).

Information from the normal space data source 110 and the threatened space data source 120 may be provided to a threat detection model creation computer 140 that uses this data to create a decision boundary (that is, a boundary that separates normal behavior from threatened behavior). The decision boundary may then be used by a threat detection computer 150 executing a threat detection model 155. The threat detection model 155 may, for example, monitor streams of data from the monitoring nodes 130 comprising data from sensor nodes, actuator nodes, and/or any other critical monitoring nodes (e.g., monitoring nodes $MN_1$ through $MN_N$), calculate a "feature" for each monitoring node based on the received data, and "automatically" output a threat alert signal to one or more remote monitoring devices 170 when appropriate (e.g., for display to a user). According to some embodiments, a threat alert signal might be transmitted to a unit controller, a plant Human-Machine Interface ("HMI"), or to a customer via a number of different transmission methods. Note that one receiver of a threat alert signal might be a cloud database that correlates multiple attacks on a wide range of plant assets. As used herein, the term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. Moreover, term "automatically" may refer to, for example, actions that can be performed with little or no human intervention. According to some embodiments, information about a detected threat may be transmitted back to the industrial control system.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The threat detection model creation computer 140 may store information into and/or retrieve information from various data stores, such as the normal space data source 110 and/or the threatened space data source 120. The various data sources may be locally stored or reside remote from the threat detection model creation computer 140 (which might be associated with, for example, offline or online learning). Although a single threat detection model creation computer 140 is shown in FIG. 1, any number of such devices may be included. Moreover, various devices described herein might be combined according to embodiments of the present invention. For example, in some embodiments, the threat detection model creation computer 140 and one or more data sources 110, 120 might comprise a single apparatus. The threat detection model creation computer 140 functions may be performed by a constellation of networked apparatuses, in a distributed processing or cloud-based architecture.

A user may access the system 100 via one of the monitoring devices 170 (e.g., a Personal Computer ("PC"), tablet, or smartphone) to view information about and/or manage threat information in accordance with any of the embodiments described herein. In some cases, an interactive graphical display interface may let a user define and/or adjust certain parameters (e.g., threat detection trigger levels) and/or provide or receive automatically generated recommendations or results from the threat detection model creation computer 140 and/or threat detection computer 150.

Figure 2:
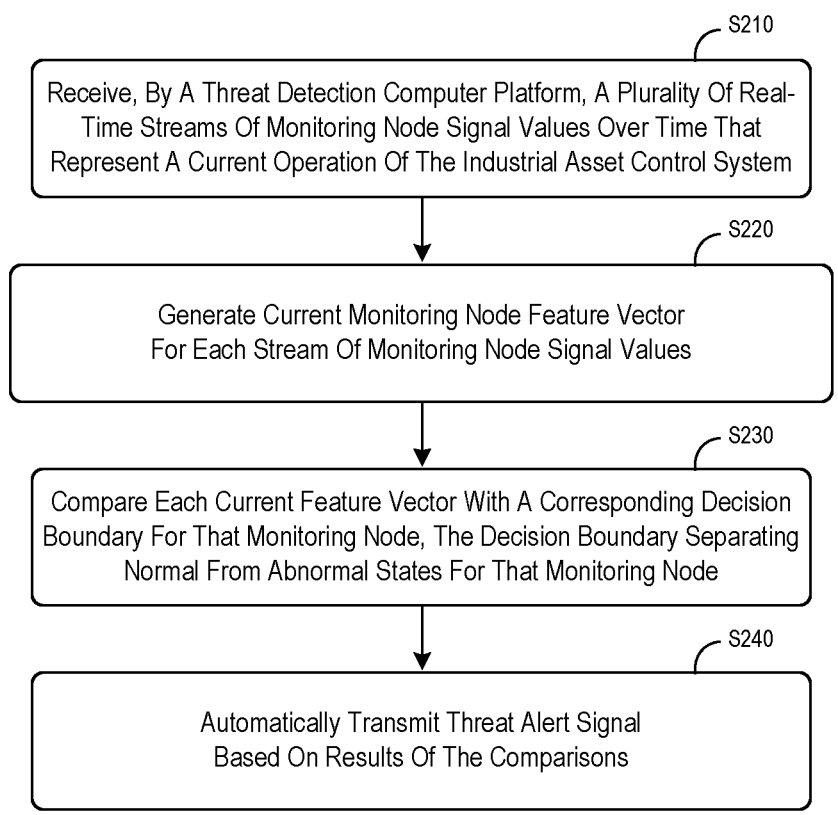
FIG. 2 is a method according to some embodiments.

For example, FIG. 2 illustrates a method that might be performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a plurality of real-time monitoring node signal inputs may receive streams of monitoring node signal values over time that represent a current operation of an industrial asset control system. At least one of the monitoring nodes (e.g., controller nodes, etc.) may be associated with, for example, sensor data, an auxiliary equipment input signal, a control intermediary parameter, and/or a control logic value.

At S220, a threat detection computer platform may receive the streams of monitoring node signal values and, for each stream of monitoring node signal values, generate a current monitoring node feature vector. According to some embodiments, at least one of the current monitoring node feature vectors is associated with principal components, statistical features, deep learning features, frequency domain features, time series analysis features, logical features, geographic or position based locations, and/or interaction features.

At S230, each generated current monitoring node feature vector may be compared to a corresponding decision boundary (e.g., a linear boundary, non-linear boundary, multi-dimensional boundary, etc.) for that monitoring node, the decision boundary separating a normal state from an abnormal state for that monitoring node. According to some embodiments, at least one monitoring node is associated with a plurality of multi-dimensional decision boundaries and the comparison at S230 is performed in connection with each of those boundaries. Note that a decision boundary might be generated, for example, in accordance with a feature-based learning algorithm and a high fidelity model or a normal operation of the industrial asset control system. Moreover, at least one decision boundary may exist in a multi-dimensional space and be associated with data generated from a dynamic model, design of experiments such as, a full factorial design, Taguchi screening design, a central composite methodology, a Box-Behnken methodology, and a real-world operating conditions methodology. In addition, a threat detection model associated with a decision boundary might, according to some embodiments, be dynamically adapted based on a transient condition, a steady state model of the industrial asset control system, and/or data sets obtained while operating the system as in self-learning systems from incoming data stream.

At S240, the system may automatically transmit a threat alert signal (e.g., a notification message, etc.) based on results of the comparisons performed at S230. The threat might be associated with, for example, an actuator attack, a controller attack, a monitoring node attack, a plant state attack, spoofing, financial damage, unit availability, a unit trip, a loss of unit life, and/or asset damage requiring at least one new part. According to some embodiments, one or more response actions may be performed when a threat alert signal is transmitted. For example, the system might automatically shut down all or a portion of the industrial asset control system (e.g., to let the detected potential cyber-attack be further investigated). As other examples, one or more parameters might be automatically modified, a software application might be automatically triggered to capture data and/or isolate possible causes, etc. Note that a threat alert signal might be transmitted via a cloud-based system, such as the PREDIX® field agent system. Note that according to some embodiments, a cloud approach might also be used to archive information and/or to store information about boundaries.

According to some embodiments, the system may further localize an origin of the threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in the threat alert signal.

Some embodiments described herein may take advantage of the physics of a control system by learning a priori from tuned high fidelity equipment models and/or actual "on the job" data to detect single or multiple simultaneous adversarial threats to the system. Moreover, according to some embodiments, all monitoring node data may be converted to features using advanced feature-based methods, and the real-time operation of the control system may be monitoring in substantially real-time. Abnormalities may be detected by classifying the monitored data as being "normal" or disrupted (or degraded). This decision boundary may be constructed using dynamic models and may help to enable early detection of vulnerabilities (and potentially avert catastrophic failures) allowing an operator to restore the control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines or machine learning techniques) may be used to generate decision boundaries. Since boundaries may be driven by measured data (or data generated from high fidelity models), defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account an operator's knowledge about system operation (e.g., the differences between normal and abnormal operation).

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Thus, some embodiments may provide an advanced anomaly detection algorithm to detect cyber-attacks on, for example, key gas turbine control sensors. The algorithm may identify which signals(s) are being attacked using monitoring node-specific decision boundaries and may inform a control system to take accommodative actions. In particular, a detection and localization algorithm might detect whether a sensor, auxiliary equipment input signal, control intermediary parameter, or control logical are in a normal or anomalous state. Some examples of gas turbine monitoring nodes that might be analyzed include: critical control sensors (e.g., a generator power transducer signal, a gas turbine exhaust temperature thermocouple signal, a gas turbine speed signal, etc.); control system intermediary parameters (e.g., generator power, gas turbine exhaust temperature, compressor discharge pressure, compressor discharge temperature, compressor pressure ratio, fuel flow, compressor inlet temperature, guide vane angle, fuel stroke reference, compressor bleed valve, inlet bleed heat valve, etc.); auxiliary equipment input signals (e.g., signals sent to actuators, motors, pumps, etc.); and/or logical commands to controller.

Some embodiments of the algorithm may utilize feature-based learning techniques based on high fidelity physics models and/or machine operation data (which would allow the algorithm to be deployed on any system) to establish a high dimensional decision boundary. As a result, detection may occur with more precision using multiple signals, making the detection more accurate with less false positives. Moreover, embodiments may detect multiple attacks on monitoring node data, and rationalize where the root cause attack originated. For example, the algorithm may decide if a signal is anomalous because of a previous signal attack, or if it is instead independently under attack. This may be accomplished, for example, by monitoring the evolution of the features as well as by accounting for time delays between attacks.

Figure 3:
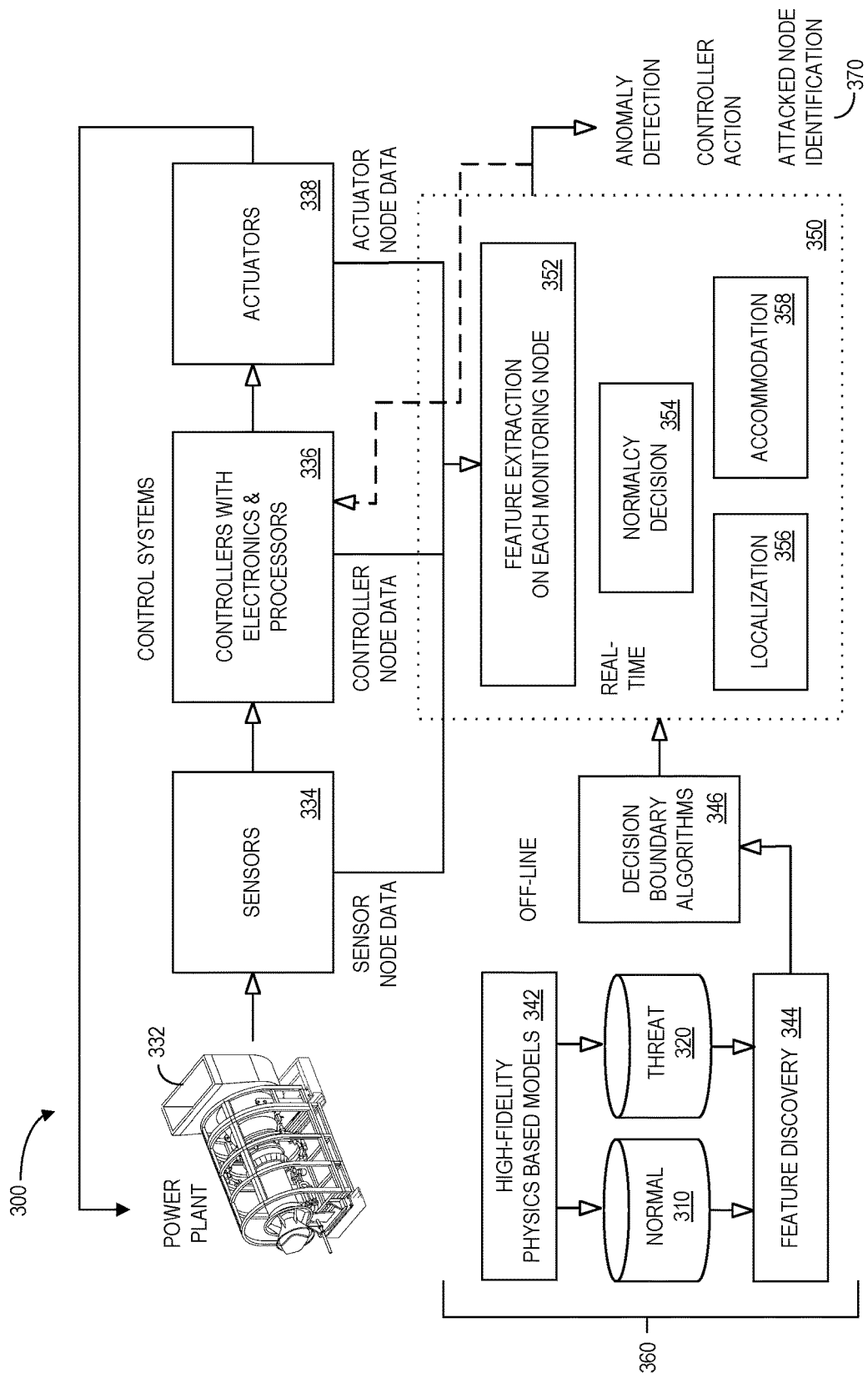
FIG. 3 is threat alert system in accordance with some embodiments.

A cyber-attack detection and localization algorithm may process a real-time turbine signal data stream and then compute features (multiple identifiers) which can then be compared to the sensor specific decision boundary. A block diagram of a system 300 utilizing a sensor specific gas turbine cyber-attack detection and localization algorithm according to some embodiments is provided in FIG. 3. In particular, a power plant 332 provides information to sensors 334 which helps controllers with electronics and processors 336 adjust actuators 338. A threat detection system 360 may include one or more high-fidelity physics based models 342 associated with the power plant 332 to create normal data 310 and/or threat data 320. The normal data 310 and threat data 320 may be accessed by a feature discovery component 344 and processed by decision boundary algorithms 346 while off-line (e.g., not necessarily while the power plant 332 is operating). The decision boundary algorithms 346 may generate a threat model including decision boundaries for various monitoring nodes. Each decision boundary may separate two data sets in a high dimensional space which is constructed by running a binary classification algorithm, such as a support vector machine using the normal data 310 and threat data 320 for each monitoring node signal (e.g., from the sensors 334, controllers 336, and/or the actuators 338).

A real-time threat detection platform 350 may receive the boundaries along with streams of data from the monitoring nodes. The platform 350 may include a feature extraction on each monitoring node element 352 and a normalcy decision 354 with an algorithm to detect attacks in individual signals using sensor specific decision boundaries, as well rationalize attacks on multiple signals, to declare which signals were attacked, and which became anomalous due to a previous attack on the system via a localization module 356. An accommodation element 358 may generate outputs 370, such as an anomaly decision indication (e.g., threat alert signal), a controller action, and/or a list of attached monitoring nodes.

During real-time detection, contiguous batches of monitoring node data may be processed by the platform 350, normalized and the feature vector extracted. The location of the vector for each signal in high-dimensional feature space may then be compared to a corresponding decision boundary. If it falls within the attack region, then a cyber-attack may be declared. The algorithm may then make a decision about where the attack originally occurred. An attack may sometimes be on the actuators 338 and then manifested in the sensors 334 data. Attack assessments might be performed in a post decision module (e.g., the localization element 356) to isolate whether the attack is related to any of the sensor, controller, or actuator (e.g., indicating which part of the monitoring node). This may be done by individually monitoring, overtime, the location of the feature vector with respect to the decision boundary. For example, when a sensor 334 is spoofed, the attacked sensor feature vector will cross the decision boundary earlier than the rest of the vectors as described with respect to FIGS. 4 through 6. If a sensor is declared to be anomalous, and the load command to the auxiliary equipment is later determined to be anomalous, it may be determined that the original attack, such as signal spoofing, occurred on the sensor 334. Conversely, if the signal to the auxiliary equipment was determined to be anomalous first, and then later manifested in the sensor 334 feedback signal, it may be determined that the signal to the equipment was initially attacked.

According to some embodiments, it may be detected whether or not a signal is in the normal operating space (or abnormal space) through the use of localized decision boundaries and real time computation of the specific signal features. Moreover, an algorithm may differentiate between a sensor being attacked as compared to a signal to auxiliary equipment being attacked. The control intermediary parameters and control logical(s) may also be analyzed using similar methods. Note that an algorithm may rationalize signals that become anomalous. An attack on a signal may then be identified.

Figure 4:
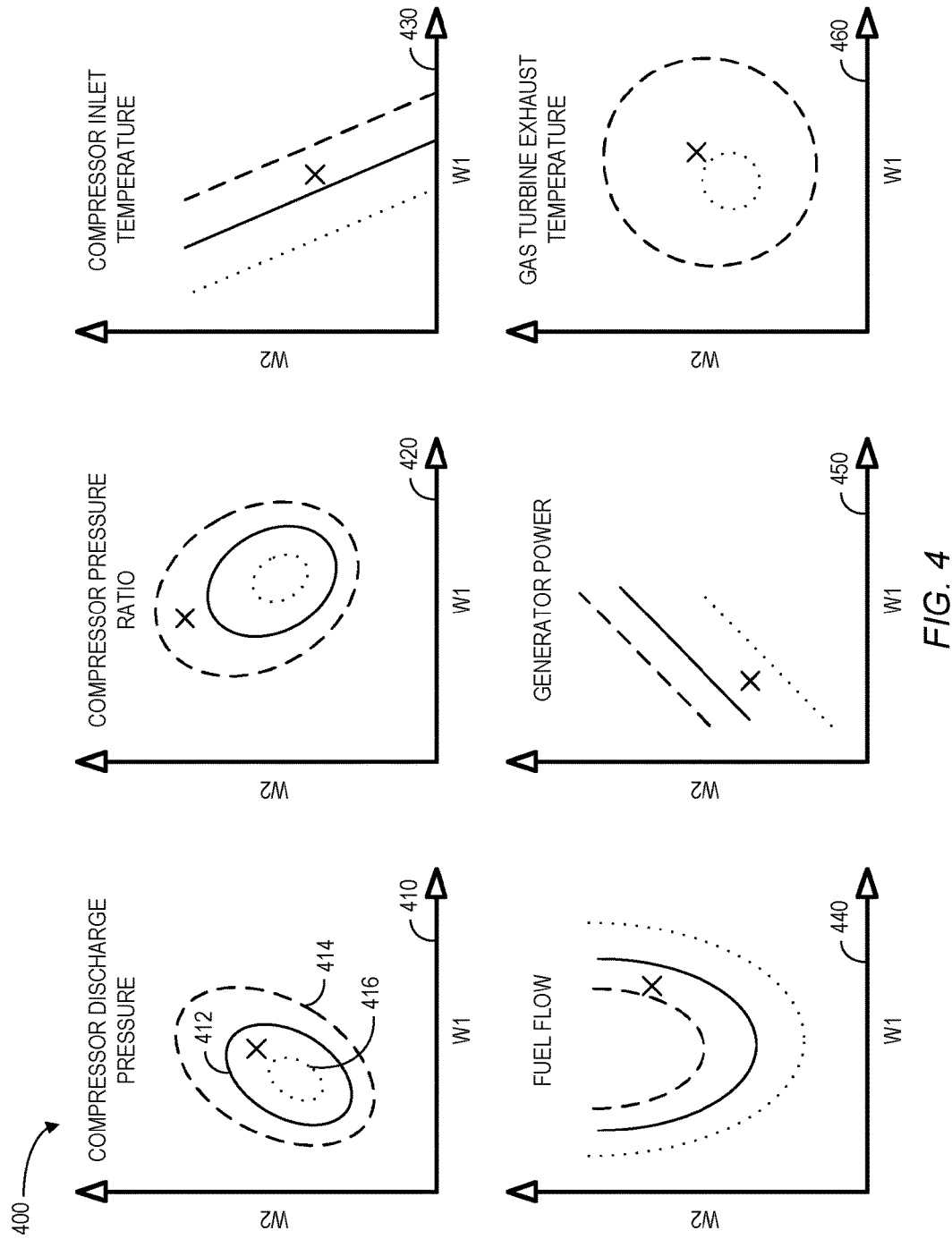
FIGS. 4 through 6 illustrate boundaries and feature vectors for various monitoring node parameters according to some embodiments.

FIG. 4 illustrates 400 boundaries and feature vectors for various monitoring node parameters in accordance with some embodiments. In particular, for each parameter a graph includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") that is performed on the input data. PCA might be one of the features that might be used by the algorithm to characterize the data, but note that other features could be leveraged.

A graph is provided for compressor discharge temperature 410, compressor pressure ratio 420, compressor inlet temperature 430, fuel flow 440, generator power 450, and gas turbine exhaust temperature 460. Each graph includes a hard boundary 412 (solid curve), minimum boundary 416 (dotted curve), and maximum boundary 414 (dashed curve) and an indication associated with current feature location for each monitoring node parameter (illustrated with an "X" on the graph). As illustrated in FIG. 4, the current monitoring node location is between the minimum and maximum boundaries (that is, the "X" is between the dotted and dashed lines). As a result, the system may determine that the operation of the industrial asset control system is normal (and no threat is being detected indicating that the system is currently under attack).

Figure 5:
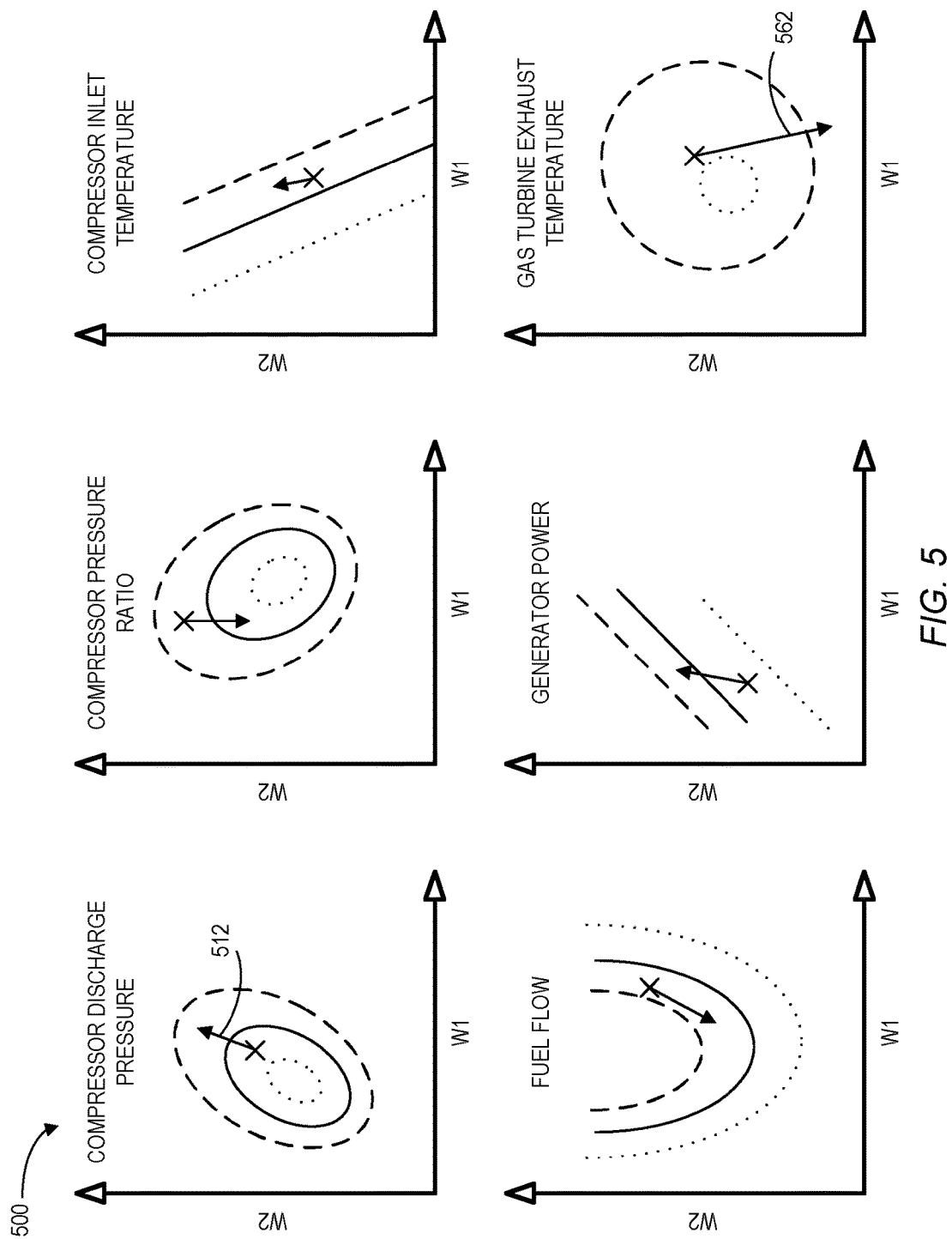

FIG. 5 illustrates 500 subsequent boundaries and feature vectors for these parameters. Consider, for example, a feature vector movement 512 for the compressor discharge pressure. Even though feature vector 512 has moved, it is still within the maximum and minimum boundaries and, as a result, normal operation of that monitoring node may be determined. This is the case for the first five graphs in FIG. 5. In this example, a feature vector movement 562 for the gas turbine exhaust temperature has exceeded with maximum boundary and, as a result, abnormal operation of that monitoring node may be determined. For example, a threat may exist for the exhaust temperature scale factor, which is a corrective value. The result is that the feature for the intermediary monitoring node signal feature vector illustrated in FIG. 5 moves 562 such that it is anomalous. The algorithm detects this cyber-attack, and two parallel actions might be initiated. One action may be post processing of the signal to discover what was attacked, in this case if the system has been monitoring each exhaust thermocouple, it may conclude that none of them are currently abnormal. Therefore, it may be determined that something used to calculate this feature was attacked. The other action may be to continually monitor and detect additional attacks. Such an approach may facilitate a detection of multiple signal attacks.

Given the example of FIG. 5, assume that the gas turbine exhaust temperature signal was attacked. This may cause the system to respond in such a way so as to put other signals into an abnormal state. This is illustrated 600 in FIG. 6, where the attack has already been detected and now other signals shown to be abnormal. In particular, feature movement for the compressor discharge pressure 612, compressor pressure ratio 622, compressor inlet temperature 632, and fuel flow 642 have all become abnormal (joining the feature vector for the gas turbine exhaust temperature 662). Note that the feature vector for generator power did not become abnormal. In order to decide whether or not these signals 612, 622, 632, 642 are truly currently under attack, a historical batch with pertinent feature vector information may be kept for some duration of time. Then when an attack is detected on another signal, this batch is examined, and the time at which the confirmed attack on gas turbine exhaust temperature as well as several subsequent elements is analyzed.

Note that one signal rationalization might be associated with a system time delay. That is, after a sensor is attacked there might be a period of time before the system returns to a steady state. After this delay, any signal that becomes anomalous might be due to an attack as opposed to the system responding.

The current methods for detecting abnormal conditions in monitoring nodes are limited to FDIA (which itself is very limited). The cyber-attack detection and localization algorithms described herein can not only detect abnormal signals of sensors, but can also detect signals sent to auxiliary equipment, control intermediary parameters and/or control logical(s). The algorithm can also understand multiple signal attacks. One challenge with correctly identifying a cyber-attack threat is that it may occur with multiple sensors being impacted by malware. According to some embodiments, an algorithm may identify in real-time that an attack has occurred, which sensor(s) are impacted, and declare a fault response. To achieve such a result, the detailed physical response of the system must be known to create acceptable decision boundaries. This might be accomplished, for example, by constructing data sets for normal and abnormal regions by running Design of Experiments ("DoE") experiments on high-fidelity models. A data set for each sensor might comprise a feature vector for given threat values (e.g., turbine speed, thermocouple scale factor, etc.). Full factorial, Taguchi screening, central composite and Box-Behnken are some of the known design methodologies used to create the attack space. When models are not available, these DoE methods are also used to collect data from real-world power generator systems. Experiments may be run at different combinations of simultaneous attacks. In some embodiments, the system may detect degraded/faulty operation as opposed to a cyber-attack. Such decisions might utilize a data set associated with a degraded/faulty operating space. At the end of this process, the system may create data sets such as "attack v/s normal" and "degraded v/s normal" for use while constructing decision boundaries. Further note that a decision boundary may be created for each signal using data sets in feature space. Various classification methods may be used to compute decision boundaries. For example, binary linear and non-linear supervised classifiers are examples of methods that could be used to obtain a decision boundary.

Figure 6:
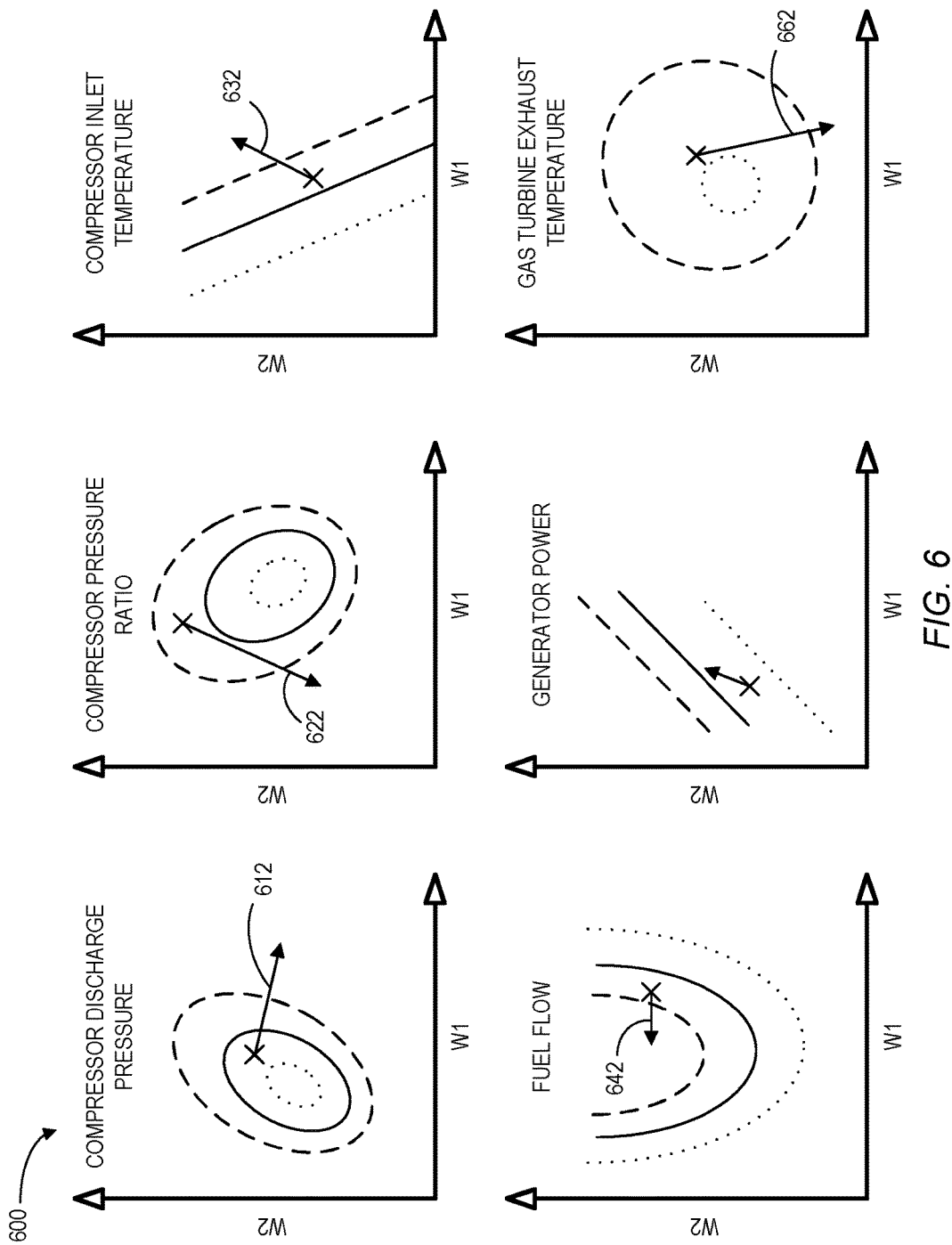

In some cases, multiple vector properties might be examined, and the information described with respect to FIGS. 4 through 6 may be processed to determine if the signal had been trending in a specific direction as the attack was detected (or if it had just been moving due to noise). Had the signal been uniformly trending as the attack took place, then this signal is a response to the original attack and not an independent attack.

Figure 7:
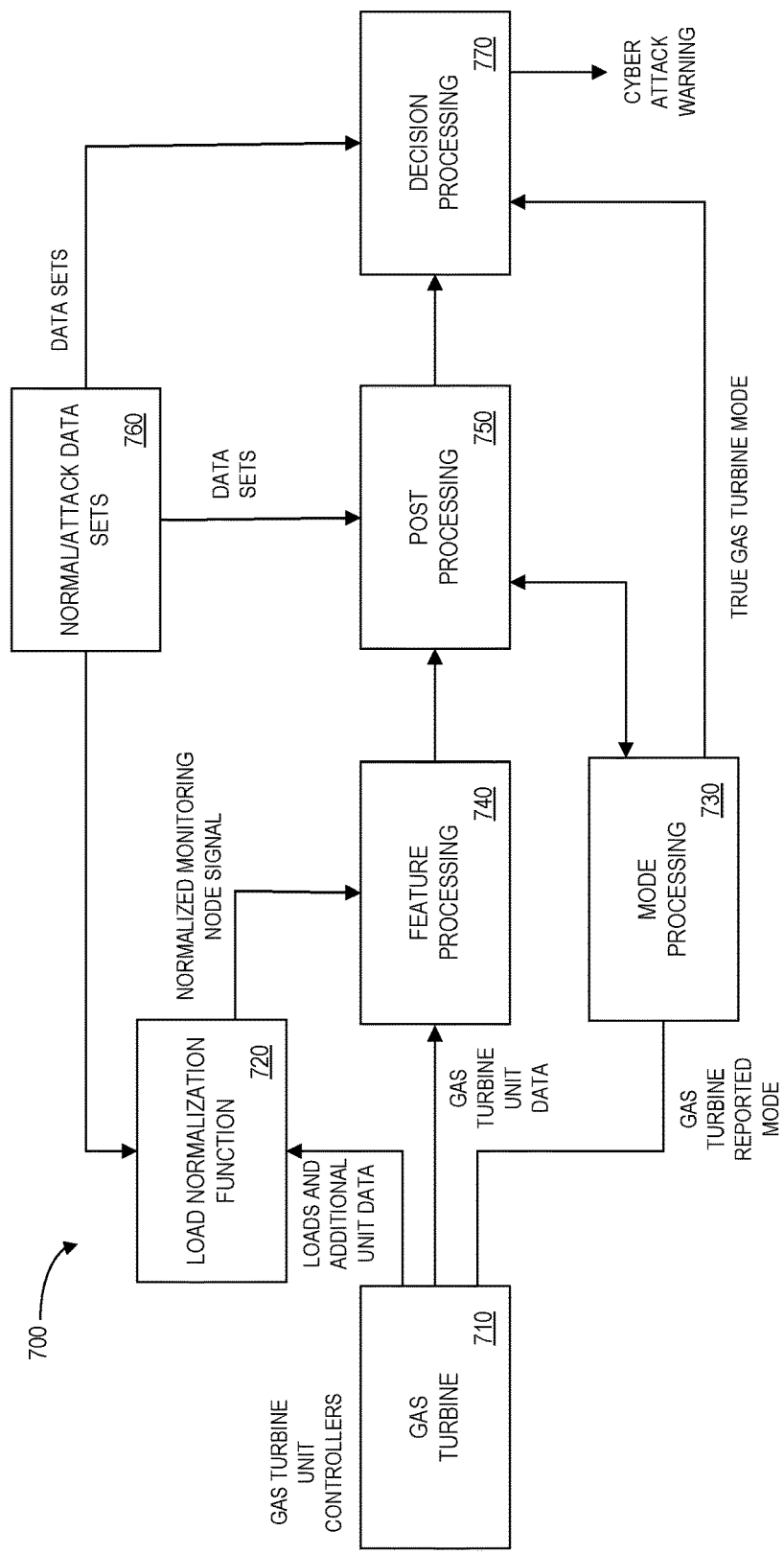
FIG. 7 illustrates a block diagram view of a cyber-attack detection system in accordance with some embodiments.

Note that an industrial asset control system may be associated with non-linear operations over a range of operating parameters (e.g., loads, temperatures, etc.). As a result, data variations can be substantial and determining when a cyber threat is present based on operation of the control system may be difficult. FIG. 7 illustrates a block diagram view of a cyber-attack detection system 700 in accordance with some embodiments. In particular, the system 700 illustrates a gas turbine 710 (e.g., associated with gas turbine unit controllers) that transmits information about loads (e.g., gas turbine loads, Adaptive Real-time Engine Simulation ("ARES" loads, etc.) to a load normalization function 720. The gas turbine 710 may also transmit information, to mode processing 730 (e.g., a gas turbine reported mode of operation) and feature processing 740 (e.g., gas turbine unit data). As will be described, the load normalization function 720 may transmit a normalized monitoring node signal to feature processing 740. Post processing 750 may receive information from feature processing 740 and transmit data to decision processing 770 (which can automatically create a cyber-attack warning based at least in part on data sets received from a normal/attack data sets storage unit 760). Thus, some embodiments may compute normalized monitoring node signals dynamically based on turbine load or temperature levels and temporal time-series signals. This normalization may provide capabilities to perform attack detection for different load conditions.

Note that embodiments might utilize temporal and/or spatial normalization. Temporal normalization may provide normalization along a time axis. Spatial normalization may be used to normalize signals along multiple nodes (e.g., sensor axis). In either case, the normalized signals may then be used to perform attack detection using feature extraction and comparisons to decision boundaries. Sensor, actuator, and controller node time-series data may be processed in substantially real-time to extract "features" from this data. The feature data may then be compared to a decision boundary to determine if a cyber-attack has occurred to the system. A similar approach may be used for detecting attacks in spatially normalized data.

The processing of the real-time data may utilize the normal operating point of the gas turbine 710. This normal operating point might be determined, for example, based on system operating modes, external conditions, system degradation factor, fuel input, etc. The real-time measured sensor data, actuator data, and controller nodes data may be processed such that a difference between actual and nominal values is computed and this difference, or delta, is normalized with the expected operating conditions coefficients.

Note that turbine load level (e.g., as represented by Mega Watts ("MW")) may be computed based on multiple measurements, and a load may be estimated from an adaptive real time engine model.

According to some embodiments, the following may be performed off-line (not real time). For a given turbine mode, the gas turbine 710 operation may be simulated using high fidelity models. The load level may be changed from a lowest operating point to a highest operating point (e.g., using step changes every predefined time interval). This simulated data produces a number of normal running data files at varying load levels. Taking one of these files, the load level may be averaged and categorized into a pre-defined load level resolution (e.g., averaged to the nearest 0.25 MW). Using these normalization packets as an input to processing of the time series signals may facilitate dynamic normalization when running in real time. These outputs from the dynamic normalization process may then be then used in a feature discovery process.

Figure 8:
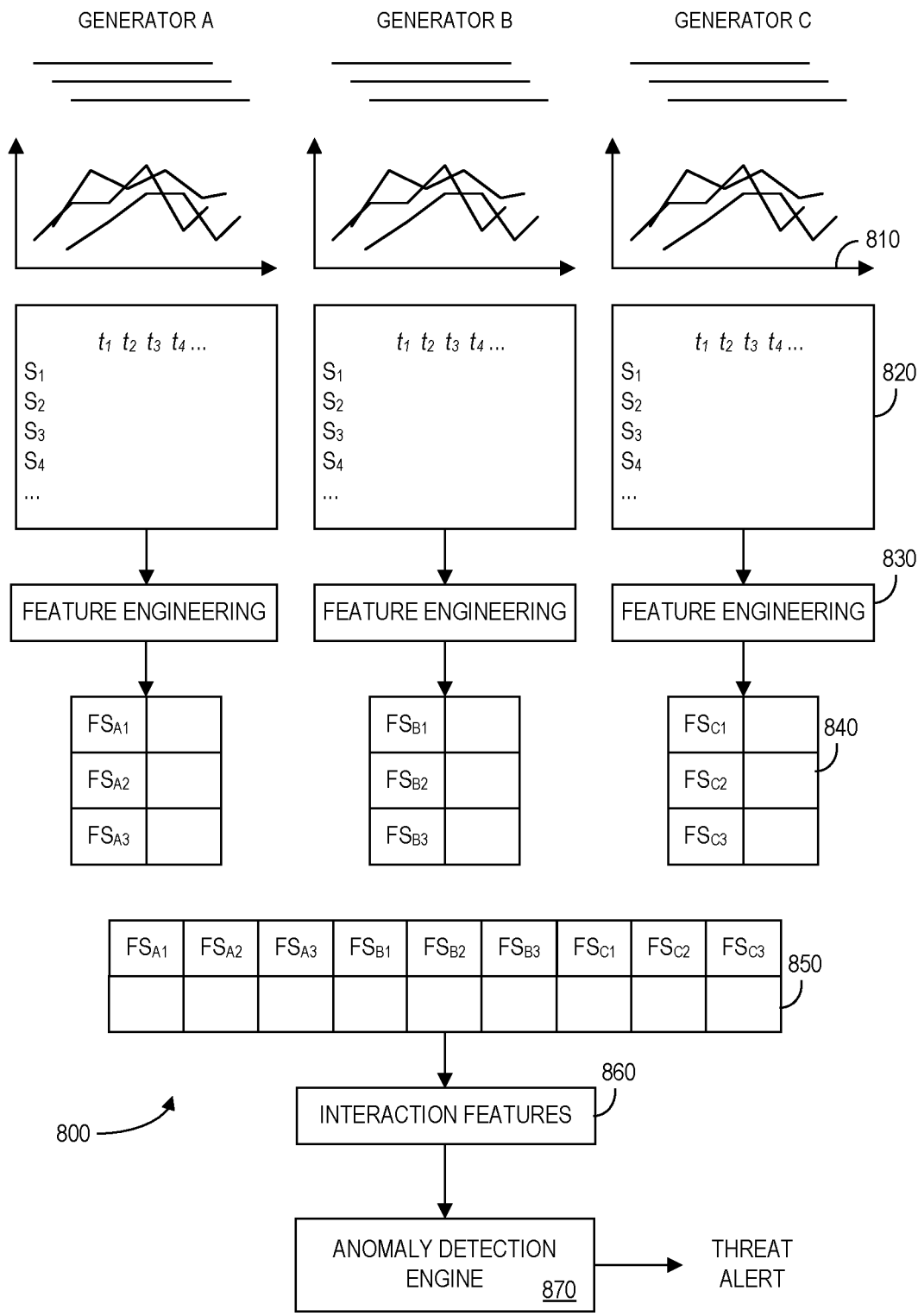
FIG. 8 is an example of a global threat protection system in accordance with some embodiments.

FIG. 8 is an example of a global threat protection system 800 in accordance with some embodiments. In particular, system includes three generators (A, B, and C) and batches of values 810 from threat nodes are collected for each generated over a period of time (e.g., 30 to 50 seconds). According to some embodiments, the batches of values 810 from threat nodes overlap in time. The values 810 from threat nodes may, for example, be stored in a matrix 820 arranged by time ($t_1$, $t_2$, etc.) and by type of threat node ($S_1$, $S_2$, etc.). Feature engineering components 830 may use information in each matrix 820 to create a feature vector 840 for each of the three generators (e.g., the feature vector 840 for generator C might include $FS_{C1}$, $FS_{C2}$, etc.). The three feature vectors 840 may then be combined into a single global feature vector 850 for the system 800. Interaction features 860 may be applied (e.g., associated with A*B*C, A+B+C, etc.) and an anomaly detection engine 870 may compare the result with a decision boundary and output a threat alert signal when appropriate. As will be described, embodiments may tune feature and boundary parameters for both the local feature vectors 840 and the global feature vector 850 to improve performance of the threat detect system 800.

Figure 9:
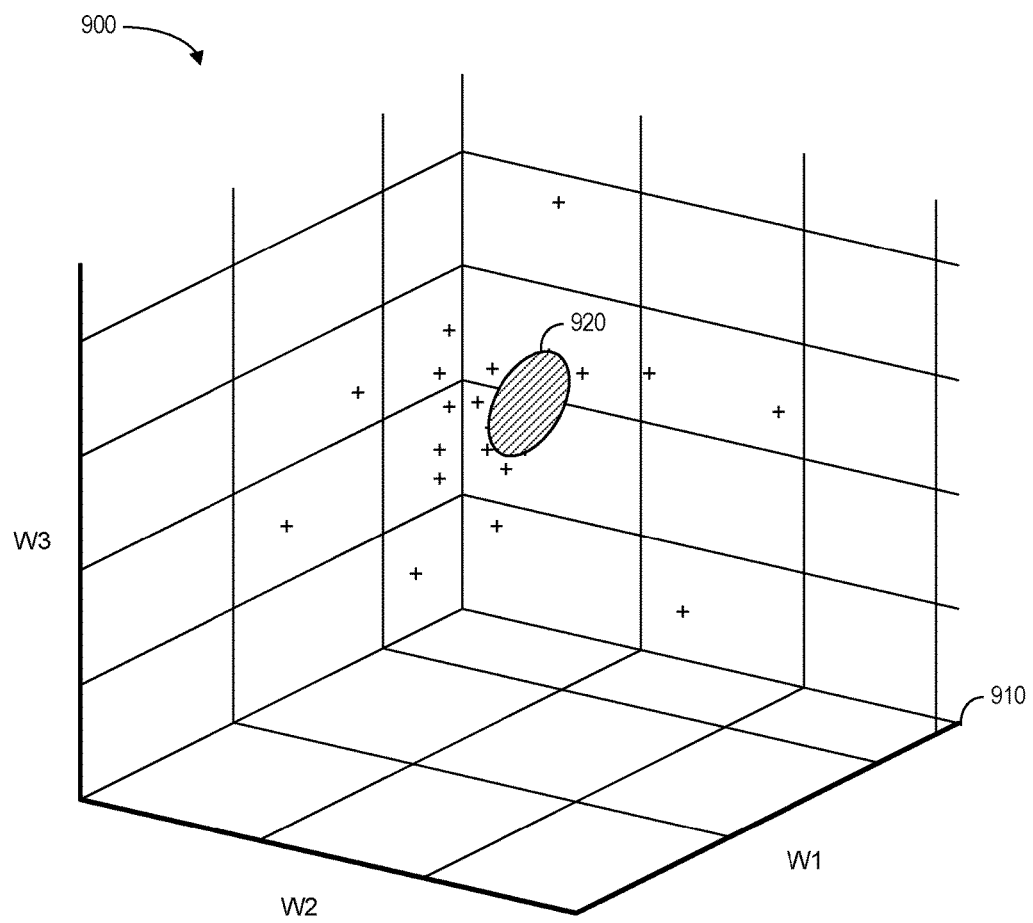
FIG. 9 illustrates three dimensions of sensor outputs in accordance with some embodiments.

FIG. 9 illustrates 900 three dimensions of threat node outputs in accordance with some embodiments. In particular, a graph 910 plots threat node outputs ("+") in three dimensions, such as dimensions associated with Principal Component Features ("PCF"): w1, w2, and w3. Moreover, the graph 910 includes an indication of a normal operating space decision boundary 920. Although a single contiguous boundary 920 is illustrated in FIG. 9, embodiments might be associated with multiple regions. Note that PCF information may be represented as weights in reduced dimensions. For example, data from each threat node may be converted to low dimensional features (e.g., weights). According to some embodiments, threat node data is normalized as follows:

$$S_{normalized}(k) = \frac{S_{nominal}(k) - S_{original}(k)}{\overline{S}_{nominal}}$$

where S stands for a threat node quantity at "k" instant of time. Moreover, output may then be expressed as a weighted linear combination of basis functions as follows:

$$S = S_0 + \sum_{j=1}^{N} w_i \Psi_j$$

where $S_0$ is the average threat node output with all threats, $w_j$ is the $j^{th}$ weight, and $\Psi_j$ is the $j^{th}$ basis vector. According to some embodiments, natural basis vectors are obtained using a covariance of the threat nodes' data matrix. Once the basis vectors are known, weight may be found using the following equation (assuming that the basis sets are orthogonal):

$$w_j = (S - S_0)^T \Psi_j$$

Note that weights may be an example of features used in a feature vector.

Figure 10:
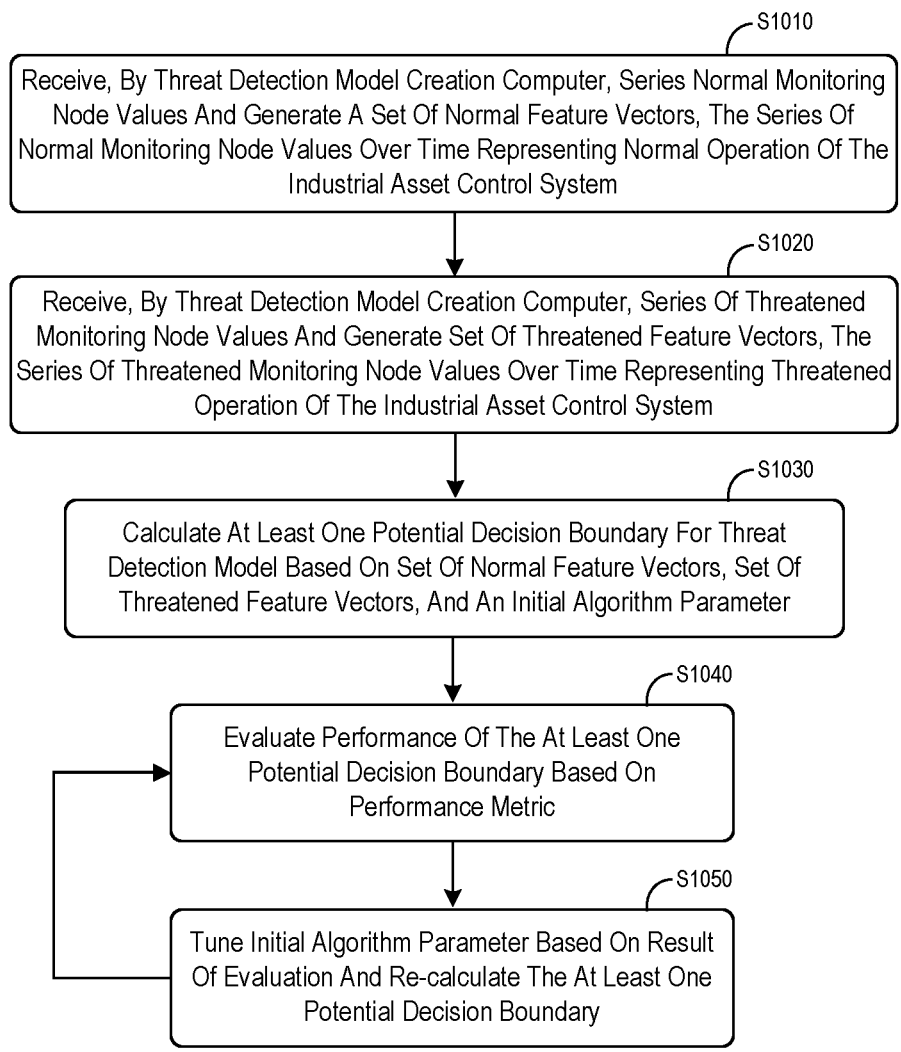
FIG. 10 is a method of feature and boundary tuning for threat detection according to some embodiments.

The threat node outputs might be used, according to some embodiments, in connection with feature and boundary tuning for threat detection. For example, FIG. 10 is a method 1000 of feature and boundary tuning for threat detection according to some embodiments. At S1010, a series of normal monitoring node values may be received by a threat detection model creation computer. The threat detection model creation computer may then generate a set of normal feature vectors, the series of normal monitoring node values over time representing normal operation of the industrial asset control system. At S1020, a series of threatened monitoring node values may be received, and a set of threatened feature vectors may be generated (representing) a threatened operation of the industrial asset control system. According to some embodiments, the series of normal monitoring node values and/or the series of threatened monitoring node values may be associated with a high fidelity equipment model.

At S1030, the system may calculate at least one potential decision boundary for a threat detection model based on the set of normal feature vectors, the set of threatened feature vectors, and at least one initial algorithm parameter. According to some embodiments, the algorithm parameter is automatically selected from a set of potential algorithm parameters. For example, a predictive model might review a large number of potential algorithm parameters to identify a sub-set of parameters as being "key" to optimizing performance of the system.

At S1040, the system may evaluate a performance of the at least one potential decision boundary based on a performance metric. As described with respect to FIG. 11, the performance metric might be associated with, for example, a receiver operator curve metric. According to some embodiments, the performance metric might be associated with a speed of threat detection. At S1050, the system may tune the at least one initial algorithm parameter based on a result of the evaluation at S1040 and re-calculate the at least one potential decision boundary. According to some embodiments, the automatic evaluation, tuning, and re-calculation of S1040 and S1050 are continuously performed until a final tuned algorithm parameter and final decision boundary are determined.

According to some embodiments, the automatic evaluation, tuning, and re-calculation of S1040 and S1050 are associated with a local feature vector and a local decision boundary. In this case, extraction of the local feature vector might be associated with, for example: a minimum, a maximum, a mean, a variance, a settling time, a fast Fourier transform spectrum, poles, shallow features, principal component analysis, independent component analysis, k-means clustering, sparse coding, and/or deep learning features.

According to some embodiments, a plurality of local feature vectors and local decision boundaries are combined to form a global feature vector and a global decision boundary (e.g., as described with respect to FIG. 8). In this case, the automatic evaluation, tuning, and re-calculation of S1040 and S1050 might be associated with the global feature vector and the global decision boundary. Moreover, at least one of the global feature vector and global decision boundary may be associated with, for example, a number of weights used for dimensionality reduction, kernel selection, a number of support vectors, a cost associated with normal data, and/or a cost associated with abnormal data.

The performance metric used to evaluate a performance of a potential decision boundary (and thus, performance of the threat detection system) might, according to some embodiments, be a Receiver Operator Curve ("ROC") measure. As used herein, a ROC measure might reflect performance of a binary classifier system as a discrimination threshold is varied. For example, FIG. 11 illustrates ROC measures 1100 for a total population in accordance with some embodiments. In particular, predicted conditions of "positive" and "negative" may be compared to true (i.e., actual) conditions of "positive" and "negative" (e.g., with "positive" indicating a cyber-threat and "negative" indicating no cyber-threat). Results of such a system would include: true positives 1110 (where a threat was predicted and did in fact exist); true negatives 1120 (where no threat was predicted and no threat existed); false positives 1130 (where a threat was predicted but no threat actually existed); and false negatives 1040 (where no threat was predict but a threat did in fact exist).

The ROC measures 1100 may be used in connection with an optimization and tuning of a cyber-threat detection algorithm to achieve, for example, low false positives. Such an algorithm might comprise, for example, a threat detection algorithm that uses features to represent time-series data from multiple monitoring nodes of in industrial asset. Features may be constructed for local monitoring nodes, and these features may then be combined into a global feature vector (and a global feature boundary may then be computed). Tuning parameters may be selected for both the creation of the global feature vector and the global feature boundary. Optimization may be performed with robust statistical ROC outputs being objective functions in conjunction with detection time metrics. Note that optimization might be performed to bias the parameters of the algorithm toward less false positives, less false negatives, or rapid detection by using various tuning parameters.

As illustrated in FIG. 11, examples of specific ROC measures 1100 might be used to gauge performance of a threat detection system include a ROC accuracy, a positive predictive value, a false discovery rate, a false omission rate, a negative predictive value, a prevalence, a true positive rate, a false positive rate, a positive likelihood ratio, a negative likelihood ratio, a false negative rate, a true negative rate, and/or a diagnostic odds ratio. By using ROC measures 1100 as objective functions for optimization, the flexibility to optimize an algorithm to various desired outcomes may be provided. The inputs may be truth labels of the evaluation set, and the algorithm may provide scores for each evaluation run.

With the objective function in place (e.g., a ROC measure 1100 or detection time), tuning of an algorithm can take place. The algorithm may first need to extract features from monitoring node data. This is where one tuning parameter might exist associated with what features extract the most useful information in accordance with the desired outcome. These features might be, for example, knowledge based features such as maximum, minimum, mean, variance, settling time, or fast Fourier transfer spectrum data, poles, etc. The features might, according to some embodiments, be "shallow" features such as those associated with a Principal Component Analysis ("PCA"), an Independent Component Analysis ("ICA"), k-means clustering, sparse coding, and/or deep learning features. This might be considered, for example, a first tuning "knob." There may also be a number of weights for the features if applicable. In this case, there may also be tuning of the number of weights used if dimensionality reduction takes place. Embodiments may now move to the tuning of a global feature boundary, where the boundary can be tuned to find which model works best, or which kernel, or the number of support vectors, or the cost associated with normal or abnormal data, etc. The algorithm may be tuned, for example, by selecting the tuning knobs, and then setting an objective function to measure performance. As a result, a self-tuning cyber detection algorithm may be provided that can tailor itself to a user's needs (as opposed to being a stagnant system).

Figure 12:
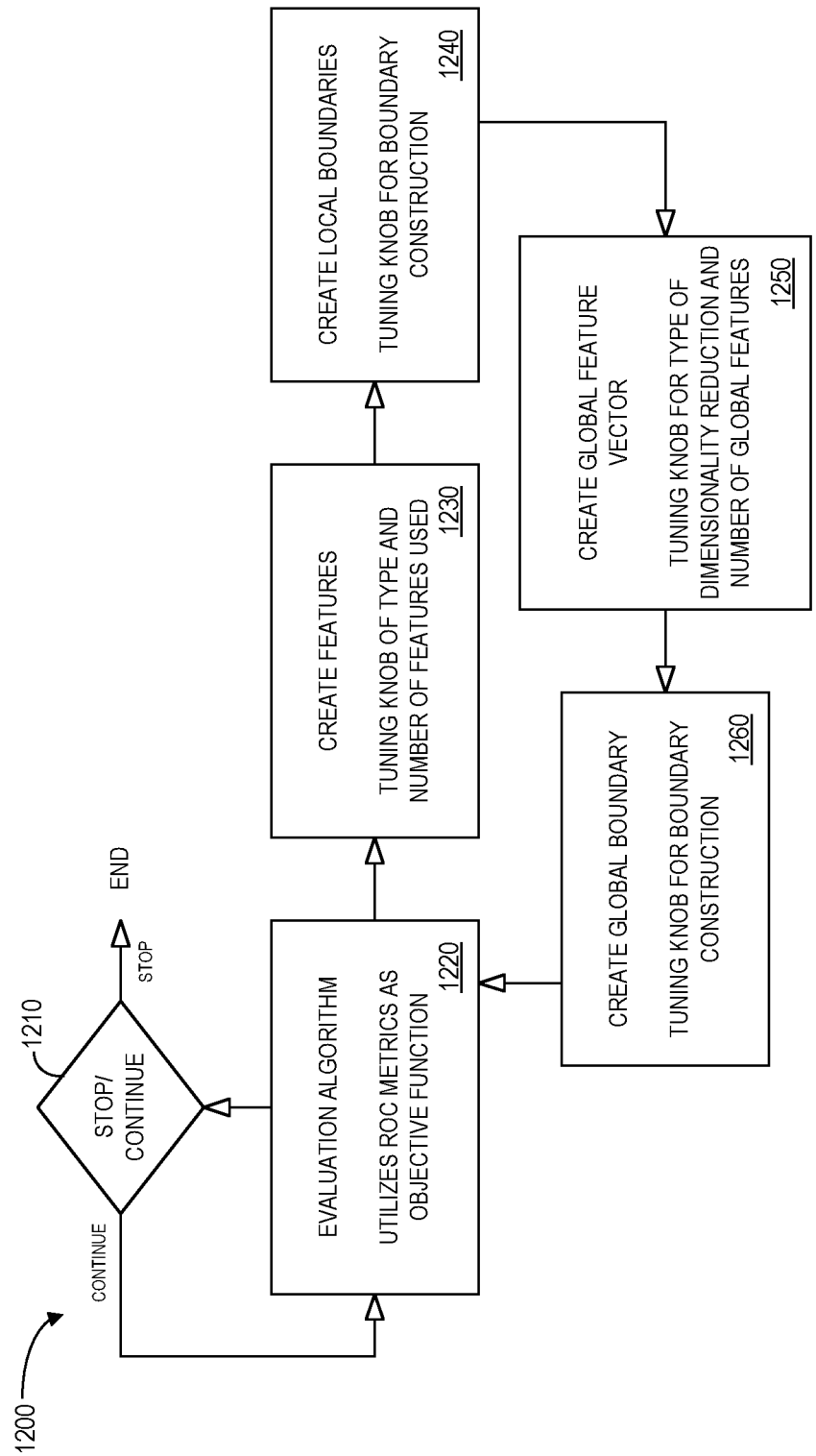
FIG. 12 is an optimization flowchart in accordance with some embodiments.

For example, FIG. 12 is an optimization flowchart 1200 in accordance with some embodiments. At 1210, the system may decide whether to stop tuning parameters (e.g., a satisfactory level of performance has been reached and the process may end). If the system decides to continue at 1210 (so that further optimization may occur), an evaluation algorithm may utilize ROC metrics as an objective function at 1220. The system may then create features at 1230, such as by using tuning knobs of type and number of feature used to create local features (note that the selection and/or setting of tuning knobs might be manual and/or automatic). At 1240, local boundaries may be created using a tuning knob for boundary construction. At 1250, a global feature vector may be created using tuning knobs for type of dimensionality reduction and number of global features. At 1260, one or more global boundaries may be created using a tuning knob for global boundary construction. the system may then return to the evaluation algorithm at 1220 and decide whether or not to continue optimization at 1210. Thus, an optimization process may allow for tailoring an algorithm to a set of defined requirements. The requirements might be ROC metrics, such as false positive, true positive, false negative, true negative, specificity, accuracy, sensitivity, or detection time metrics such as time to detect global abnormality, time to localize abnormality, etc.

Some embodiments may provide an ability to alter algorithm performance and behavior to suit user needs. This might be especially important in the cyber security space, where there are many applications arising in the growing field of Industrial Control System ("ICS") security. In applications where implications of a cyberattack are lower, such as some manufacturing plants, a user may want no normal operating activity to be identified as "abnormal" because this would impede production. In another application, such as power generation or commercial transportation, it might be critical to know when a cyber-attack is occurring. In this case, incorrectly flagging normal operation as an attack on occasion might be acceptable because operators can execute processes to check and remediate the situation (and the consequences of accidentally missing an attack could be substantial). In some embodiments, an optimization and tuning method might tune only the number of weights (features) used in an algorithm for simplicity. Note that an Area Under Curve ("AUC") analysis of one or more ROC measures could be implemented in accordance with embodiments described herein.

Figure 13:
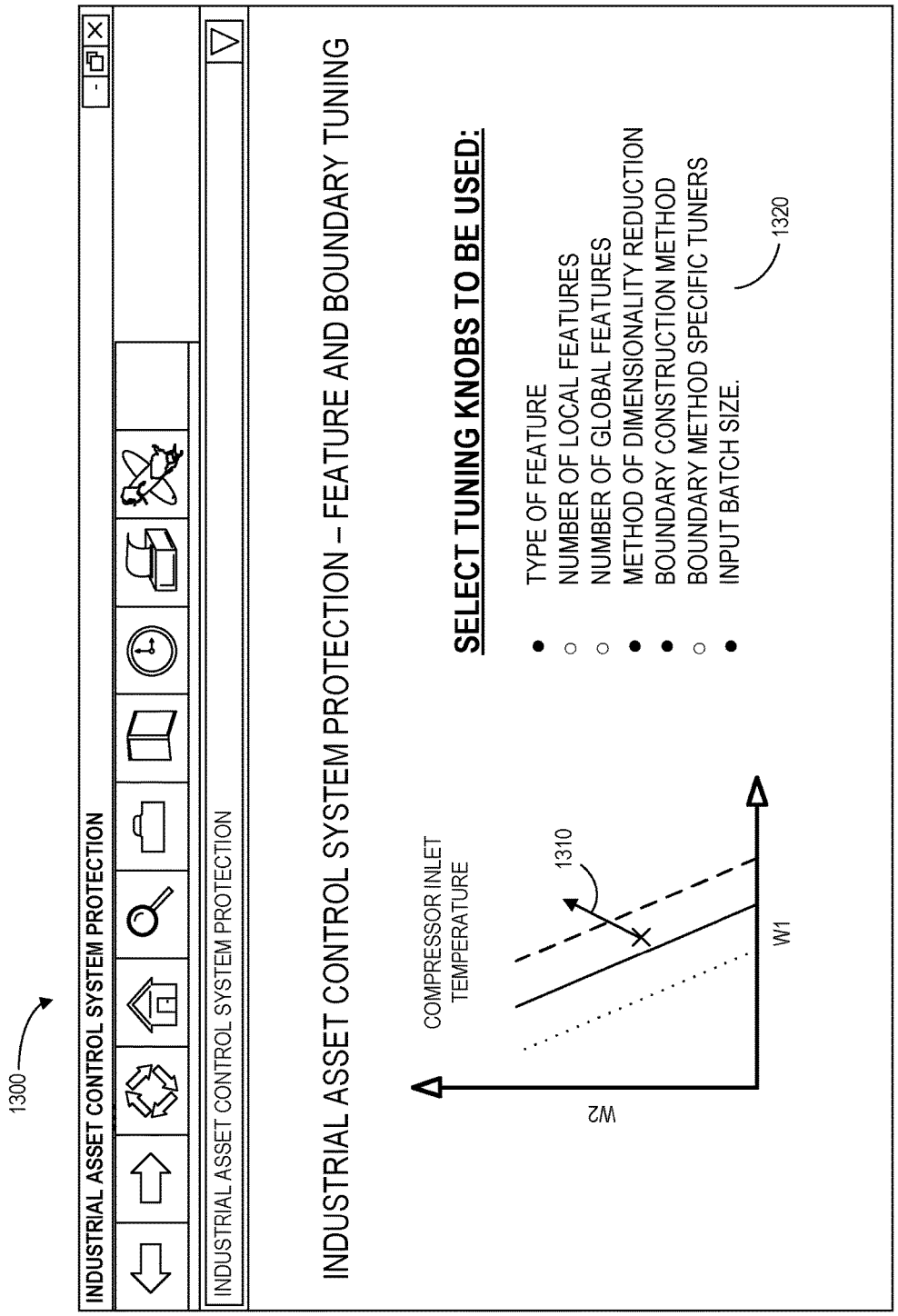
FIG. 13 is a display according to some embodiments.

Note that tuning parameters may be automatically selected by a system and/or be based on user input. For example, FIG. 13 is a display 1300 illustrates an interactive Graphical User Interface ("GUI") display 1300 that might display monitoring node information (e.g., including a current feature vector 1310 and decision boundaries) along with a user input area 1320 that may be used to select one or more tuning knobs. For example, a user might select to utilize a type of feature, a number of local features, a number of global features, a method of dimensionality reduction (e.g., a PCA, a Principal Component Regression ("PCR"), a Fisher Discriminator Analysis ("FDA"), etc.), a boundary construction method (e.g., a Support Vector Machine ("SVM"), boundary method specific tuners (e.g., a kernel function, a box constrain, or a cost), an input batch size. etc.

Figure 14:
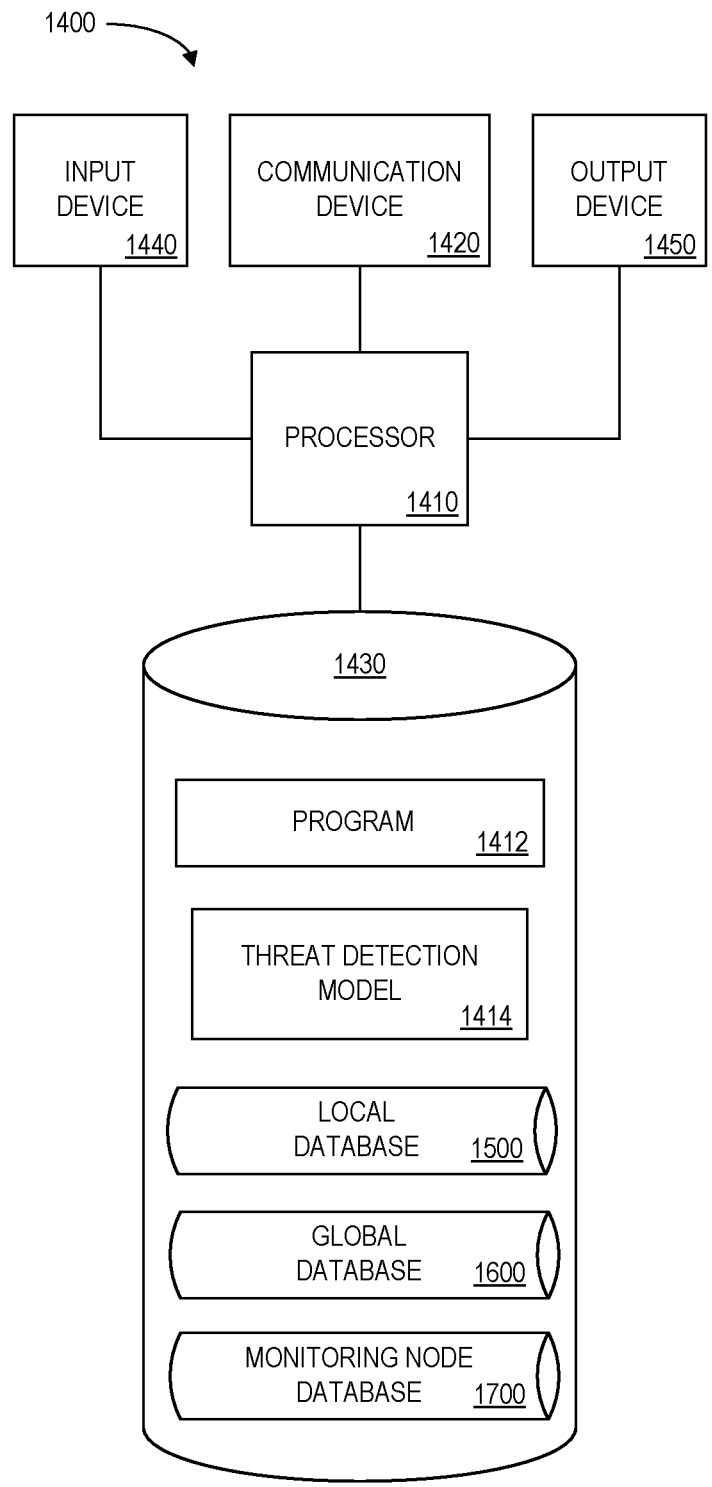
FIG. 14 is a block diagram of an industrial asset control system protection platform according to some embodiments of the present invention.

The embodiments described herein may be implemented using any number of different hardware configurations. For example, FIG. 14 is a block diagram of an industrial asset control system protection platform 1400 that may be, for example, associated with the system 140 of FIG. 1. The industrial asset control system protection platform 1400 comprises a processor 1410, such as one or more commercially available Central Processing Units ("CPUs") in the form of one-chip microprocessors, coupled to a communication device 1420 configured to communicate via a communication network (not shown in FIG. 14). The communication device 1420 may be used to communicate, for example, with one or more remote monitoring nodes, user platforms, etc. The industrial asset control system protection platform 1400 further includes an input device 1440 (e.g., a computer mouse and/or keyboard to input tuning knob selections and/or predictive modeling information) and/an output device 1450 (e.g., a computer monitor to render a display, provide alerts, transmit recommendations, and/or create reports). According to some embodiments, a mobile device, monitoring physical system, and/or PC may be used to exchange information with the industrial asset control system protection platform 1400.

The processor 1410 also communicates with a storage device 1430. The storage device 1430 may comprise any appropriate information storage device, including combinations of magnetic storage devices (e.g., a hard disk drive), optical storage devices, mobile telephones, and/or semiconductor memory devices. The storage device 1430 stores a program 1412 and/or a threat detection model 1414 for controlling the processor 1410. The processor 1410 performs instructions of the programs 1412, 1414, and thereby operates in accordance with any of the embodiments described herein. For example, the processor 1410 may receive a series of normal monitoring node values (representing normal operation of the industrial asset control system) and generate a set of normal feature vectors. The processor 1410 may also receive a series of threatened monitoring node values (representing a threatened operation of the industrial asset control system) and generate a set of threatened feature vectors. At least one potential decision boundary for a threat detection model may be calculated by the processor 1410 based on the set of normal feature vectors, the set of threatened feature vectors, and an initial algorithm parameter. A performance of the at least one potential decision boundary may be evaluated by the processor 1410 based on a performance metric. The initial algorithm parameter may then be tuned by the processor 1410 based on a result of the evaluation, and the at least one potential decision boundary may be re-calculated.

The programs 1412, 1414 may be stored in a compressed, uncompiled and/or encrypted format. The programs 1412, 1414 may furthermore include other program elements, such as an operating system, clipboard application, a database management system, and/or device drivers used by the processor 1410 to interface with peripheral devices.

As used herein, information may be "received" by or "transmitted" to, for example: (i) the industrial asset control system protection platform 1400 from another device; or (ii) a software application or module within the industrial asset control system protection platform 1400 from another software application, module, or any other source.

In some embodiments (such as the one shown in FIG. 14), the storage device 1430 further stores a local database 1500, global database 1600, and a monitoring node database 1700. Example of databases that may be used in connection with the industrial asset control system protection platform 1400 will now be described in detail with respect to FIGS. 15 through 17. Note that the databases described herein are only examples, and additional and/or different information may be stored therein. Moreover, various databases might be split or combined in accordance with any of the embodiments described herein.

Figure 15:
FIG. 15 is a tabular portion of a local database in accordance with some embodiments.

Referring to FIG. 15, a table is shown that represents the local database 1500 that may be stored at the industrial asset control system protection platform 1400 according to some embodiments. The table may include, for example, entries associated with local features and boundaries of an industrial asset control system. The table may also define fields 1502, 1504, 1506, 1508, 1510 for each of the entries. The fields 1502, 1504, 1506, 1508, 1510 may, according to some embodiments, specify: an industrial asset identifier 1502, an initial algorithm parameter 1506, a performance metric 1506, an adjusted algorithm parameter 1508, and local features and boundaries 1510. The local database 1500 may be created and updated, for example, off line (non-real time) when a new physical system is monitored or modeled.

The industrial asset identifier 1502 may be, for example, a unique alphanumeric code identifying an industrial asset to be monitored (e.g., a jet turbine system, manufacturing plant, wind farm, etc.). The initial algorithm parameter 1504 might comprise, for example, a value that is used to calculate a local decision boundary (e.g., based on normal and threatened feature vectors). The performance metric 1506 may be, for example, a value used to evaluate performance of the decision boundary (e.g., a ROC measure, speed of detection, etc.). The adjusted algorithm parameter 1508 might reflect updates made to the initial algorithm parameter 1504 in accordance with tuning knobs (e.g., associated with the performance metric 1506). The local features and boundaries 1510 might represent the final solution after an optimization process is complete.

Figure 16:
FIG. 16 is a tabular portion of global database in accordance with some embodiments.

Referring to FIG. 16, a table is shown that represents the global database 1600 that may be stored at the industrial asset control system protection platform 1400 according to some embodiments. The table may include, for example, entries associated with global features and boundaries of an industrial asset control system. The table may also define fields 1602, 1604, 1606, 1608, 1610 for each of the entries. The fields 1602, 1604, 1606, 1608, 1610 may, according to some embodiments, specify: an industrial asset identifier 1602, an initial algorithm parameter 1606, a performance metric 1606, an adjusted algorithm parameter 1608, and global features and boundaries 1610. The global database 1600 may be created and updated, for example, off line (non-real time) when a new physical system is monitored or modeled.

The industrial asset identifier 1602 may be, for example, a unique alphanumeric code identifying an industrial asset to be monitored and may be based on, or associated with, the industrial asset identifier 1502 in the local database 1500. The initial algorithm parameter 1604 might comprise, for example, a value that is used to calculate a global decision boundary. The performance metric 1606 may be, for example, a value used to evaluate performance of the decision boundary (e.g., a ROC measure, speed of detection, etc.). The adjusted algorithm parameter 1608 might reflect updates made to the initial algorithm parameter 1604 in accordance with tuning knobs (e.g., associated with the performance metric 1606). The global features and boundaries 1610 might represent the final solution after an optimization process is complete.

Referring to FIG. 17, a table is shown that represents the monitoring node database 1700 that may be stored at the industrial asset control system protection platform 1100 according to some embodiments. The table may include, for example, entries identifying monitoring nodes associated with a physical system. The table may also define fields 1702, 1704, 1706, 1708, 1710, 1712 for each of the entries. The fields 1702, 1704, 1706, 1708, 1710, 1712 may, according to some embodiments, specify: a monitoring node identifier 1702, monitoring node values 1704, features 1706, feature vectors 1708, a global feature vector 1710, and a decision 1712. The monitoring node database 1700 may be created and updated, for example, when a new physical system is monitored or modeled, threat nodes report values, operating conditions change, etc.

The monitoring node identifier 1702 may be, for example, a unique alphanumeric code identifying a threat node in an industrial asset control system that detects the series of monitoring node values 1704 over time (e.g., in batches of 30 to 50 seconds of data). The monitoring node values 1704 may be used to create the features 1706 and feature vectors 1708 (e.g., in accordance with optimized tuning parameters). The feature vectors 1710 associated with multiple monitoring node identifiers 1702 may then be used to create an overall global feature vector 1710 for the entire industrial asset control system (e.g., in accordance with optimized tuning parameters). The global feature vector 1710 can then be compared to a decision boundary to generate the decision 1712 (e.g., an "attack" or a "normal" indication).

Thus, embodiments may provide an industrial asset with cyber-attack protection in accordance with a user's particular needs (e.g., desired false positive rate). Moreover, embodiments may enable the passive detection of indications of multi-class abnormal operations using real-time signals from monitoring nodes. Still further, the detection framework may allow for the development of tools that facilitate proliferation of the invention to various systems (i.e., gas turbines, steam turbines, wind turbines, aviation engines, locomotive engines, power grid, etc.) in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new learnings and alternate sources of data become available. As a result, embodiments may detect a relatively wide range of cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to industrial asset control system operators so that an attack may be thwarted (or the effects of the attack may be blunted), reducing damage to equipment.

Note that cyber security is an important function required in the protection of assets, such as power plant equipment. Dynamic normalization in this space may improve the resolution of detection. The machines associated with industrial assets can be very complex, and embodiments described herein may permit an implementation of a cyber security algorithm that makes detections fast and reliably. Note that a Receiver Operating Characteristics ("ROC") curve might be used to evaluate the use of dynamic normalization for load fluctuations (e.g., including indications of true and false positive detections, true and false negative detections, etc.).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on gas turbine generators, any of the embodiments described herein could be applied to other types of assets, such as dams, the power grid, military devices, etc.

Some embodiments have described the use of pre-selected tuning knobs and/or tuning knob parameters. According to some embodiments, a tuning approach may use online data for adaptive tuning to optimize algorithm parameters and improve ROC statistics. Such a need may arise, for example, when system components are replaced, a new asset is introduced, a new feature is introduced, a kernel function is changed etc. When tuning online with up-to-date models, the system may generate enough cases to perform evaluation runs. Model parameters may be tuned using online tuning algorithms to make them represent a current behavior of the system. In such an approach, performance measures (ROC statistics, etc.) may be used depending on a user's objective. If implemented plant models no longer match the state of a real industrial asset, then new decision boundaries may developed using "one-class" learning (semi-supervised learning), where only normal operational data is consumed. In one-class learning, false positives might be used as performance measure instead of other ROC statistics.

According to some embodiments, information about attack statuses may be interwoven between different industrial asset plants. For example, one power plant might be aware of the status of other nodes (in other power plants) and such an approach might further help thwart coordinated cyber-threats. In addition to automatic threat detection, some embodiments described herein might provide systems with an additional cyber layer of defense and be deployable without custom programming (e.g., when using operating data). Some embodiments may be sold with a license key and could be incorporated as monitoring service. For example, boundaries might be periodically updated when equipment at an industrial asset plant is upgraded.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect an industrial asset control system, comprising:
   a normal space data source storing, for each of a plurality of monitoring nodes, a series of normal monitoring node values over time that represent normal operation of the industrial asset control system;
   a threatened space data source storing, for each of the plurality of monitoring nodes, a series of threatened monitoring node values over time that represent a threatened operation of the industrial asset control system; and
   a threat detection model creation computer, coupled to the normal space data source and the threatened space data source, to:
   (i) receive the series normal monitoring node values and generate a set of normal feature vectors,
   (ii) receive the series of threatened monitoring node values and generate a set of threatened feature vectors,
   (iii) automatically calculate at least one potential decision boundary for a threat detection model based on the set of normal feature vectors, the set of threatened feature vectors, and at least one initial algorithm parameter,
   (iv) automatically evaluate a performance of the at least one potential decision boundary based on a performance metric, and
   (v) automatically tune the at least one initial algorithm parameter based on a result of said evaluation and re-calculate the at least one potential decision boundary.

2. The system of claim 1, wherein said automatic evaluation, tuning, and re-calculation are performed until a final tuned algorithm parameter and final decision boundary are determined.

3. The system of claim 1, wherein said automatic evaluation, tuning, and re-calculation are associated with a local feature vector and a local decision boundary.

4. The system of claim 3, wherein extraction of the local feature vector is associated with at least one of: a minimum, a maximum, a mean, a variance, a settling time, a fast Fourier transform spectrum, poles, shallow features, principal component analysis, independent component analysis, k-means clustering, sparse coding, and deep learning features.

5. The system of claim 1, wherein a plurality of local feature vectors and local decision boundaries are combined to form a global feature vector and a global decision boundary, and said automatic evaluation, tuning, and re-calculation are associated with the global feature vector and the global decision boundary.

6. The system of claim 5, wherein at least one of the global feature vector and global decision boundary are associated with a number of weights used for dimensionality reduction, kernel selection, a number of support vectors, a cost associated with normal data, and a cost associated with abnormal data.

7. The system of claim 1, wherein the performance metric comprises a Receiver Operator Characteristic ("ROC") metric.

8. The system of claim 7, wherein the ROC metric is associated with at least one of: true positives, true negatives, false positives, false negatives, an area under curve value, a ROC accuracy, a positive predictive value, a false discovery rate, a false omission rate, a negative predictive value, a prevalence, a true positive rate, a false positive rate, a positive likelihood ratio, a negative likelihood ratio, a false negative rate, a true negative rate, and a diagnostic odds ratio.

9. The system of claim 1, wherein the performance metric is associated with a speed of threat detection.

10. The system of claim 1, wherein the algorithm parameter is automatically selected from a set of potential algorithm parameters.

11. The system of claim 1, wherein the initial algorithm parameter is associated with at least one of: a type of feature, a number of local features, a number of global features, a method of dimensionality reduction, a principal component analysis, a principal component regression, a Fisher discriminator analysis, a support vector machine, a boundary construction method, boundary method specific tuners, a kernel function, a box constrain, a cost, and an input batch size.

12. The system of claim 1, wherein at least one of the series of normal monitoring node values and the series of threatened monitoring node values are associated with a high fidelity equipment model.

13. The system of claim 1, wherein at least one of said automatic calculation, evaluation, and tuning are performed based at least in part on an online update received from a remote industrial asset control system information source.

14. The system of claim 1, further comprising:
   a plurality of real-time monitoring node signal inputs to receive streams of monitoring node signal values over time that represent a current operation of the industrial asset control system; and
   a threat detection computer platform, coupled to the plurality of real-time monitoring node signal inputs and the threat detection model creation computer, to:
   (i) receive the streams of monitoring node signal values,
   (ii) for each stream of monitoring node signal values, generate a current monitoring node feature vector,
   (iii) select an appropriate decision boundary for each monitoring node, the appropriate decision boundary separating a normal state from an abnormal state for that monitoring node in the current cooperating mode,
   (iv) compare each generated current monitoring node feature vector with the selected corresponding appropriate decision boundary, and
   (v) automatically transmit a threat alert signal based on results of said comparisons.

15. The system of claim 14, wherein the threat alert signal transmission is performed using at least one of: a cloud-based system, an edge-based system, a wireless system, a wired system, a secured network, and a communication system.

16. The system of claim 14, wherein the threat is associated with at least one of: an actuator attack, a controller attack, a monitoring node attack, a plant state attack, spoofing, financial damage, unit availability, a unit trip, a loss of unit life, and asset damage requiring at least one new part.

17. A computerized method to protect an industrial asset control system, comprising:
- receiving, by a threat detection model creation computer, a series of normal monitoring node values and generating a set of normal feature vectors, wherein the series of normal monitoring node values over time represent normal operation of the industrial asset control system;
- receiving, by the threat detection model creation computer, a series of threatened monitoring node values and generating set of threatened feature vectors, wherein the series of threatened monitoring node values over time represent a threatened operation of the industrial asset control system;
- calculating at least one potential decision boundary for a threat detection model based on the set of normal feature vectors, the set of threatened feature vectors, and at least one initial algorithm parameter;
- evaluating a performance of the at least one potential decision boundary based on a performance metric; and
- tuning the at least one initial algorithm parameter based on a result of said evaluation and re-calculating the at least one potential decision boundary.

18. The method of claim 17, wherein said evaluation, tuning, and re-calculation are performed until a final tuned algorithm parameter and final decision boundary are determined.

19. A non-transient, computer-readable medium storing instructions to be executed by a processor to perform a method of protecting an industrial asset control system, the method comprising:
- receiving a series of normal monitoring node values and generating a set of normal feature vectors, wherein the series of normal monitoring node values over time represent normal operation of the industrial asset control system;
- receiving a series of threatened monitoring node values and generating set of threatened feature vectors, wherein the series of threatened monitoring node values over time represent a threatened operation of the industrial asset control system;
- calculating at least one potential decision boundary for a threat detection model based on the set of normal feature vectors, the set of threatened feature vectors, and at least one initial algorithm parameter;
- evaluating a performance of the at least one potential decision boundary based on a performance metric; and
- tuning the at least one initial algorithm parameter based on a result of said evaluation and re-calculating the at least one potential decision boundary.

20. The medium of claim 19, wherein said evaluation, tuning, and re-calculation are performed until a final tuned algorithm parameter and final decision boundary are determined.

* * * * *